United States Patent
Wang et al.

(10) Patent No.: US 10,802,648 B1
(45) Date of Patent: Oct. 13, 2020

(54) CHARGE-PUMP CIRCUIT ADAPTABLE TO TDDI

(71) Applicant: HIMAX TECHNOLOGIES LIMITED, Tainan (TW)

(72) Inventors: Hui-Min Wang, Tainan (TW); Yaw-Guang Chang, Tainan (TW)

(73) Assignee: Himax Technologies Limited, Tainan (TW)

(*) Notice: Subject to any disclaimer, the term of this patent is extended or adjusted under 35 U.S.C. 154(b) by 0 days.

(21) Appl. No.: 16/653,892

(22) Filed: Oct. 15, 2019

(51) Int. Cl.
*G06F 3/041* (2006.01)
*H02M 3/07* (2006.01)

(52) U.S. Cl.
CPC ........ *G06F 3/04166* (2019.05); *G06F 3/0412* (2013.01); *H02M 3/07* (2013.01)

(58) Field of Classification Search
CPC ..... G06F 3/04166; G06F 3/0412; H02M 3/07
See application file for complete search history.

(56) References Cited

U.S. PATENT DOCUMENTS

| | | | | |
|---|---|---|---|---|
| 2010/0103150 | A1* | 4/2010 | Huang | G09G 3/3696 345/205 |
| 2016/0260409 | A1 | 9/2016 | Lin et al. | |
| 2017/0104090 | A1* | 4/2017 | Koezuka | G09G 3/20 |
| 2018/0284910 | A1* | 10/2018 | Peretz | G06F 3/0386 |
| 2019/0032864 | A1* | 1/2019 | Xiong | F21V 3/061 |
| 2019/0033793 | A1* | 1/2019 | Komatsu | H03L 7/07 |
| 2019/0324543 | A1* | 10/2019 | Kazdan | G04G 7/00 |

OTHER PUBLICATIONS https://www.electronicdesign.com/power-management/article/21801632/the-chargepump-option-to-ldo-and-inductorbased-regulators. (Year: 2016).*

* cited by examiner

*Primary Examiner* — Chad M Dicke
(74) *Attorney, Agent, or Firm* — Donald E. Stout; Stout, Uxa & Buyan, LLP

(57) ABSTRACT

A charge-pump circuit includes a clock generator that generates a clock signal; a sensing waveform generator that generates a sensing signal; a first diode having a cathode electrically connected to a predetermined low voltage; a first capacitor having a first plate electrically coupled to receive the clock signal, and a second plate electrically connected to an anode of the first diode; a second diode having a cathode electrically connected to the second plate of the first capacitor; and a second capacitor having a first plate electrically coupled to receive the sensing signal, and a second plate electrically connected to an anode of the second diode at an output node. The clock signal being generated in a charge-pump period alternates in time with the sensing signal being generated in a touch-sensing period.

16 Claims, 2 Drawing Sheets

CHARGE-PUMP CIRCUIT ADAPTABLE TO TDDI

BACKGROUND OF THE INVENTION

1. Field of the Invention

The present invention generally relates to a DC-to-DC converter, and more particularly to a charge-pump circuit adaptable to a touch and display driver integration (TDDI).

2. Description of Related Art

A DC-to-DC converter is an electronic circuit that converts a source of direct current (DC) from one voltage level to another. The DC-to-DC converter is a type of electric power converter with power levels ranging from very low to very high.

A charge-pump circuit is a kind of DC-to-DC converter that uses capacitors for charge storage to raise or lower voltage. The charge-pump circuit generally has simple circuitry but high efficiencies, sometimes as high as 90-95%.

Touch and display driver integration (TDDI) is an integrated driver capable of driving both a touch panel and a display panel. However, when the charge-pump circuit is adopted, the TDDI commonly having a voltage span of 32 volts should drive a touch/display panel having a voltage span of more than 40 volts, a difficult situation needs to be resolved. Therefore, a need has arisen to propose a novel charge-pump circuit adaptable to the TDDI without sacrificing high efficiency of the charge-pump circuit.

SUMMARY OF THE INVENTION

In view of the foregoing, it is an object of the embodiment of the present invention to provide a charge-pump circuit adaptable to a touch and display driver integration (TDDI) capable of driving a touch/display panel having a large voltage span.

According to one embodiment, a charge-pump circuit includes a clock generator, a sensing waveform generator, a first diode, a first capacitor, a second diode and a second capacitor. The clock generator generates a clock signal oscillating between a high state associated with a predetermined high voltage and a low state associated with a predetermined low voltage. The sensing waveform generator generates a sensing signal for performing touch sensing. The first diode has a cathode electrically connected to the predetermined low voltage. The first capacitor has a first plate electrically coupled to receive the clock signal, and a second plate electrically connected to an anode of the first diode at an intermediate node. The second diode has a cathode electrically connected to the second plate of the first capacitor at the intermediate node. The second capacitor has a first plate electrically coupled to receive the sensing signal, and a second plate electrically connected to an anode of the second diode at an output node. The clock signal being generated in a charge-pump period alternates in time with the sensing signal being generated in a touch-sensing period.

DETAILED DESCRIPTION OF THE INVENTION

Figure 1:
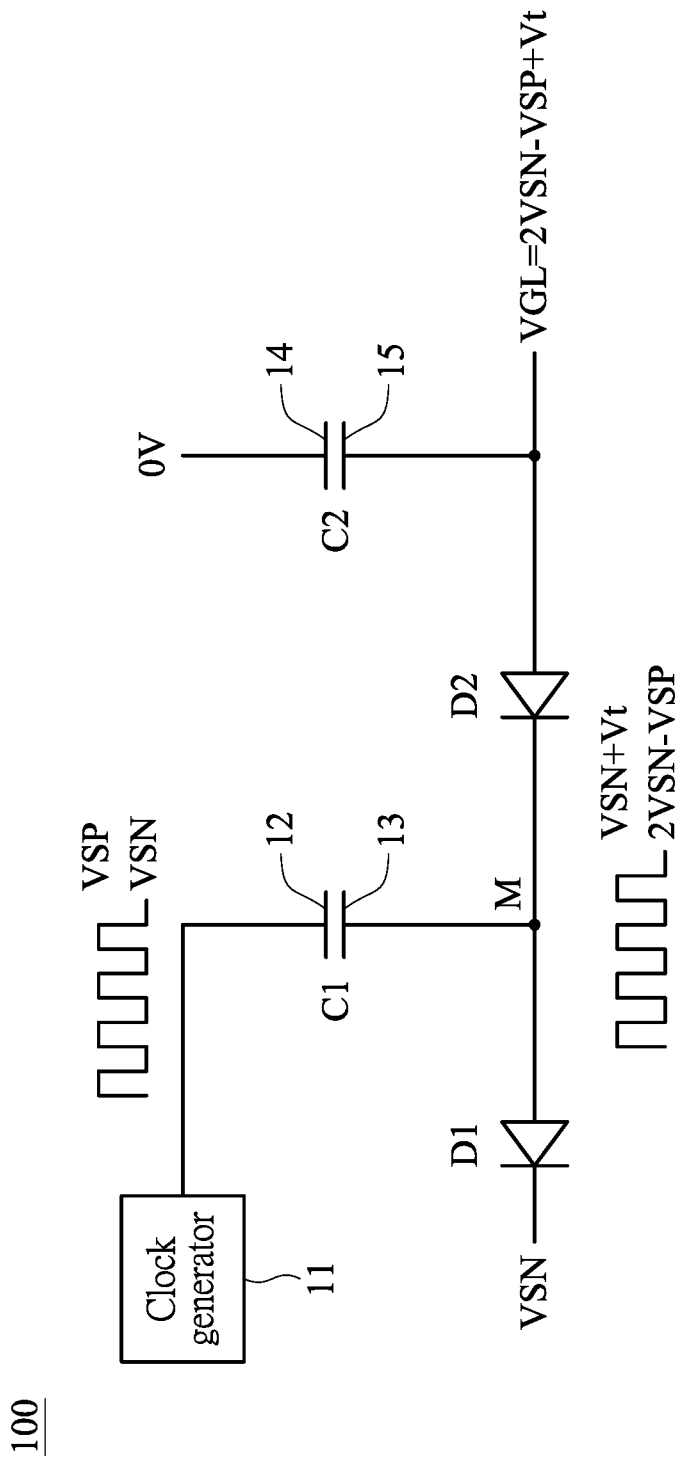
FIG. 1 shows a circuit diagram illustrating a charge-pump circuit adaptable to a display driver.

FIG. 1 shows a circuit diagram illustrating a charge-pump circuit 100 adaptable to a display driver. The charge-pump circuit 100 may include a clock generator 11 disposed in the display driver and configured to generate a clock signal (e.g., a square wave as depicted) that oscillates between a high state associated with a predetermined high voltage VSP and a low state associated with a predetermined low voltage VSN.

The charge-pump circuit 100 may include an (external) first diode D1 that is external to the display driver. The first diode D1 may have a cathode (e.g., an N side of a p-n junction diode) electrically connected to the predetermined low voltage VSN. The charge-pump circuit 100 may include an (external) first capacitor C1 having a first plate 12 electrically coupled to receive the clock signal (of the clock generator 11), and a second plate 13 electrically connected to an anode (e.g., a P side of the p-n junction diode) of the first diode D1 at an intermediate node M.

The charge-pump circuit 100 may include an (external) second diode D2 having a cathode electrically connected to the second plate 13 of the first capacitor C1 at the intermediate node M. The charge-pump circuit 100 may include an (external) second capacitor C2 having a first plate 14 electrically connected to a ground (e.g., 0 volt), and a second plate 15 electrically connected to an anode of the second diode D2 at an output node VGL.

In a first stage of operation, when the clock signal is in the high state (i.e., the high voltage VSP), the first diode D1 is forward-biased (or turned on), and the intermediate node M is charged to the predetermined low voltage VSN plus a diode threshold voltage drop Vt (i.e., VSN+Vt). In the first stage, the second diode D2 is reverse-biased (or turned off), thus separating the second capacitor C2 from the rest of the charge-pump circuit 100.

In a second stage of operation, when the clock signal is in the low state (i.e., the low voltage VSN), the second diode D2 is forward-biased (or turned on) while the first diode D1 is reverse-biased (or turned off). Therefore, the second diode D2 becomes in series with the first capacitor C1 and the clock signal. Accordingly, the output node VGL is charged to 2×VSN−VSP+Vt, while a voltage at the intermediate node M is 2×VSN−VSP. In one example, when the predetermined high voltage VSP is 6 volt, the predetermined low voltage VSN is −6 volt, and the diode threshold voltage Vt is 0.7 volt, the output node VGL is charged to −17.3 volt. According to the charge-pump circuit 100 as set forth above, the charge-pump circuit 100 can provide a larger voltage span than a voltage span of the display driver.

Figure 2:
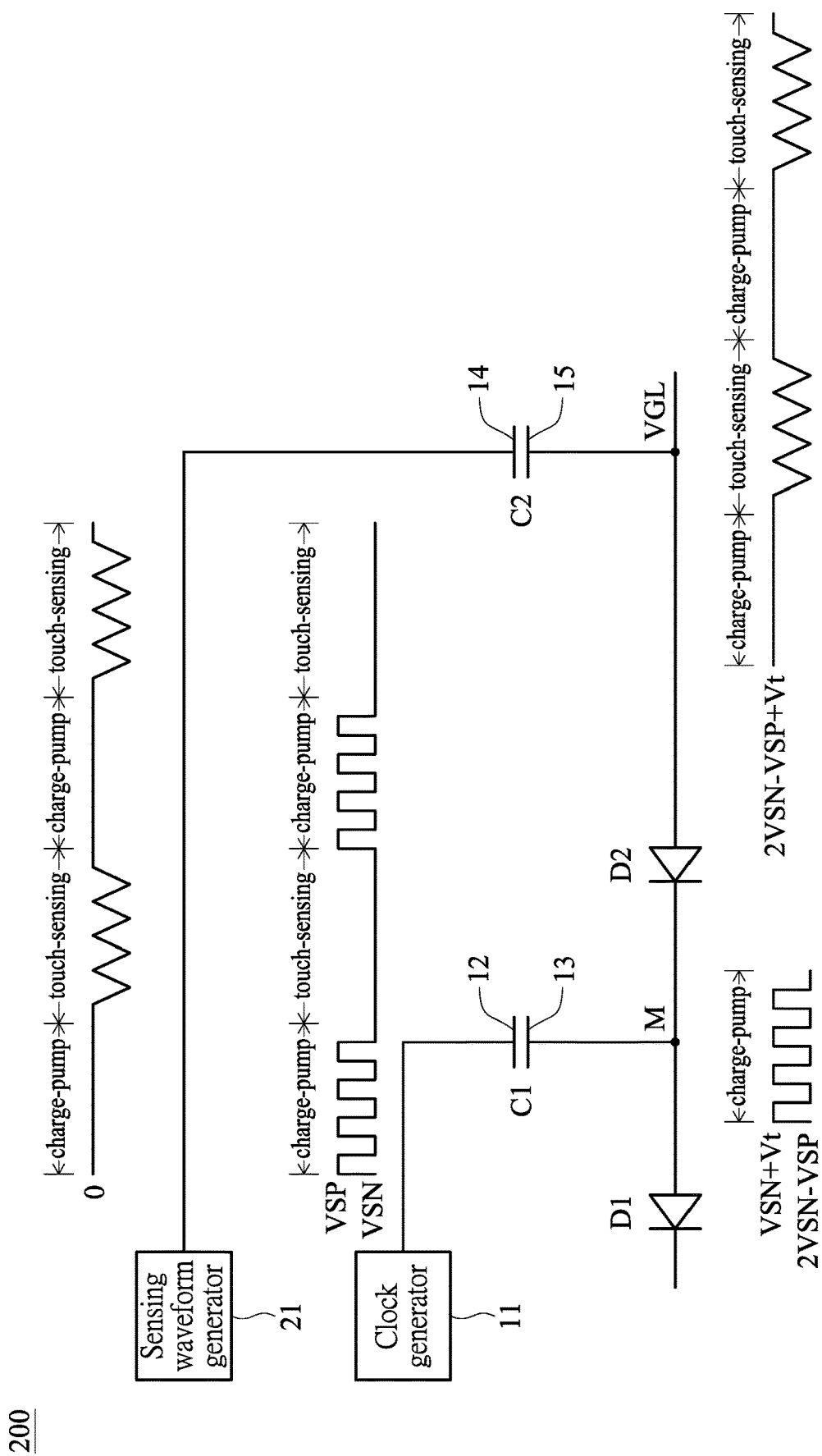
FIG. 2 shows a circuit diagram illustrating a charge-pump circuit adaptable to a touch and display driver integration (TDDI) according to one embodiment of the present invention.

FIG. 2 shows a circuit diagram illustrating a charge-pump circuit 200 adaptable to a touch and display driver integration (TDDI) according to one embodiment of the present invention. The charge-pump circuit 200 is similar in architecture to the charge-pump circuit 100 of FIG. 1, and may include a clock generator 11 (disposed in the TDDI), an (external) first diode D1, an (external) second diode D2, an (external) first capacitor C1 and an (external) second capacitor C2, details of which are omitted for brevity.

According to one aspect of the embodiment, the charge-pump circuit 200 may further include a sensing waveform generator 21 disposed in the TDDI and configured to generate a sensing (drive) signal (e.g., a triangle wave as depicted) for performing touch sensing that oscillates between the ground (e.g., 0 volt) and a predetermined negative voltage (e.g., −5 volts). According to another aspect of the embodiment, the first plate 14 of the second capacitor C2 may be electrically coupled to receive the sensing signal, rather than coupled to the ground as in FIG. 1.

According to a further aspect of the embodiment, the clock signal (of the clock generator 11) and the sensing signal (of the sensing waveform generator 21) are generated in a time-sharing manner. Specifically, the clock signal is generated in a charge-pump (or display) period, followed by generating the sensing signal in a touch-sensing period. Alternatively speaking, the sensing signal alternates with the clock signal in time such that the sensing signal is regularly generated after (or before) the clock signal.

In a first stage of operation during the charge-pump period, when the clock signal is in the high state (i.e., the high voltage VSP), the first diode D1 is forward-biased (or turned on), and the intermediate node M is charged to the predetermined low voltage VSN plus a diode threshold voltage drop Vt (i.e., VSN+Vt). In the first stage, the second diode D2 is reverse-biased (or turned off), thus separating the second capacitor C2 from the rest of the charge-pump circuit 100.

In a second stage of operation during the charge-pump period, when the clock signal is in the low state (i.e., the low voltage VSN), the second diode D2 is forward-biased (or turned on) while the first diode D1 is reverse-biased (or turned off). Therefore, the second diode D2 becomes in series with the first capacitor C1 and the clock signal. Accordingly, the output node VGL is charged to 2×VSN−VSP+Vt, while a voltage at the intermediate node M is 2×VSN−VSP.

During the touch-sensing period, the second diode D2 is forward-biased (or turned on) while the first diode D1 is reverse-biased (or turned off). The output node VGL is further charged downwards (i.e., having a more negative voltage) with the sensing signal (e.g., the triangle wave as depicted) from the output voltage 2×VSN−VSP+Vt in the charge-pump period, thereby resulting in a voltage being more negative than 2×VSN−VSP+Vt. According to the embodiment as set forth above, the charge-pump circuit 200 can provide a larger voltage span (e.g., greater than 40 volts) than a voltage span (e.g., less than 32 volts) of the TDDI.

Although specific embodiments have been illustrated and described, it will be appreciated by those skilled in the art that various modifications may be made without departing from the scope of the present invention, which is intended to be limited solely by the appended claims.

What is claimed is:

1. A charge-pump circuit, comprising:
   a clock generator that generates a clock signal oscillating between a high state associated with a predetermined high voltage and a low state associated with a predetermined low voltage;
   a sensing waveform generator that generates a sensing signal for performing touch sensing;
   a first diode having a cathode electrically connected to the predetermined low voltage;
   a first capacitor having a first plate electrically coupled to receive the clock signal, and a second plate electrically connected to an anode of the first diode at an intermediate node;
   a second diode having a cathode electrically connected to the second plate of the first capacitor at the intermediate node; and
   a second capacitor having a first plate electrically coupled to receive the sensing signal, and a second plate electrically connected to an anode of the second diode at an output node;
   wherein the clock signal being generated in a charge-pump period alternates in time with the sensing signal being generated in a touch-sensing period.

2. The circuit of claim 1, wherein the sensing signal oscillates between ground and a predetermined negative voltage.

3. The circuit of claim 1, wherein in a first stage of operation during the charge-pump period, when the clock signal is in the high state, the first diode is forward-biased but the second diode is reverse-biased, thereby charging the intermediate node to VSN+Vt, where VSN represents the predetermined low voltage and Vt represents a diode threshold voltage drop.

4. The circuit of claim 3, wherein in a second stage of operation during the charge-pump period, when the clock signal is in the low state, the second diode is forward-biased but the first diode is reverse-biased, thereby charging the output node to 2×VSN−VSP+Vt, while a voltage at the intermediate node is 2×VSN−VSP, where VSP represents the predetermined high voltage.

5. The circuit of claim 4, wherein in the touch-sensing period, the second diode is forward-biased but the first diode is reverse-biased, thereby further charging the output node downwards with the sensing signal from 2×VSN−VSP+Vt.

6. The circuit of claim 1, wherein the clock generator and the sensing waveform generator are disposed in a touch and display driver integration (TDDI), and the charge-pump circuit provides a larger voltage span than a voltage span of the TDDI.

7. A charge-pump circuit adaptable to a touch and display driver integration (TDDI), comprising:
   a first diode having a cathode electrically connected to a predetermined low voltage;
   a first capacitor having a first plate electrically coupled to receive a clock signal oscillating between a high state associated with a predetermined high voltage and a low state associated with the predetermined low voltage, and a second plate electrically connected to an anode of the first diode at an intermediate node;
   a second diode having a cathode electrically connected to the second plate of the first capacitor at the intermediate node; and
   a second capacitor having a first plate electrically coupled to receive a sensing signal for performing touch sensing, and a second plate electrically connected to an anode of the second diode at an output node;
   wherein the clock signal being generated in a charge-pump period alternates in time with the sensing signal being generated in a touch-sensing period.

8. The circuit of claim 7, wherein the sensing signal oscillates between ground and a predetermined negative voltage.

9. The circuit of claim 7, wherein in a first stage of operation during the charge-pump period, when the clock signal is in the high state, the first diode is forward-biased but the second diode is reverse-biased, thereby charging the intermediate node to VSN+Vt, where VSN represents the predetermined low voltage and Vt represents a diode threshold voltage drop.

10. The circuit of claim 9, wherein in a second stage of operation during the charge-pump period, when the clock signal is in the low state, the second diode is forward-biased but the first diode is reverse-biased, thereby charging the output node to 2×VSN−VSP+Vt, while a voltage at the intermediate node is 2×VSN−VSP, where VSP represents the predetermined high voltage.

11. The circuit of claim 10, wherein in the touch-sensing period, the second diode is forward-biased but the first diode is reverse-biased, thereby further charging the output node downwards with the sensing signal from 2×VSN−VSP+Vt.

12. The circuit of claim 7, wherein the clock signal is generated by a clock generator disposed in the TDDI and the sensing signal is generated by a sensing waveform generator disposed in the TDDI, and the charge-pump circuit provides a larger voltage span than a voltage span of the TDDI.

13. A charge-pump circuit, comprising:
- a clock generator that generates a clock signal oscillating between a high state associated with a predetermined high voltage and a low state associated with a predetermined low voltage;
- a first diode having a cathode electrically connected to the predetermined low voltage;
- a first capacitor having a first plate electrically coupled to receive the clock signal, and a second plate electrically connected to an anode of the first diode at an intermediate node;
- a second diode having a cathode electrically connected to the second plate of the first capacitor at the intermediate node; and a second capacitor having a first plate electrically coupled to ground, and a second plate electrically connected to an anode of the second diode at an output node and wherein the predetermined high voltage is a positive voltage and the predetermined low voltage is a negative voltage.

14. The circuit of claim 13, wherein in a first stage of operation, when the clock signal is in the high state, the first diode is forward-biased but the second diode is reverse-biased, thereby charging the intermediate node to VSN+Vt, where VSN represents the predetermined low voltage and Vt represents a diode threshold voltage drop.

15. The circuit of claim 14, wherein in a second stage of operation, when the clock signal is in the low state, the second diode is forward-biased but the first diode is reverse-biased, thereby charging the output node to 2×VSN−VSP+Vt, while a voltage at the intermediate node is 2×VSN−VSP, where VSP represents the predetermined high voltage.

16. The circuit of claim 13, wherein the clock generator is disposed in a display driver, and the charge-pump circuit provides a larger voltage span than a voltage span of the display driver.

* * * * *